No. 742,261. PATENTED OCT. 27, 1903.
L. F. VOLBERDING.
GATE HINGE.
APPLICATION FILED FEB. 20, 1903.
NO MODEL.
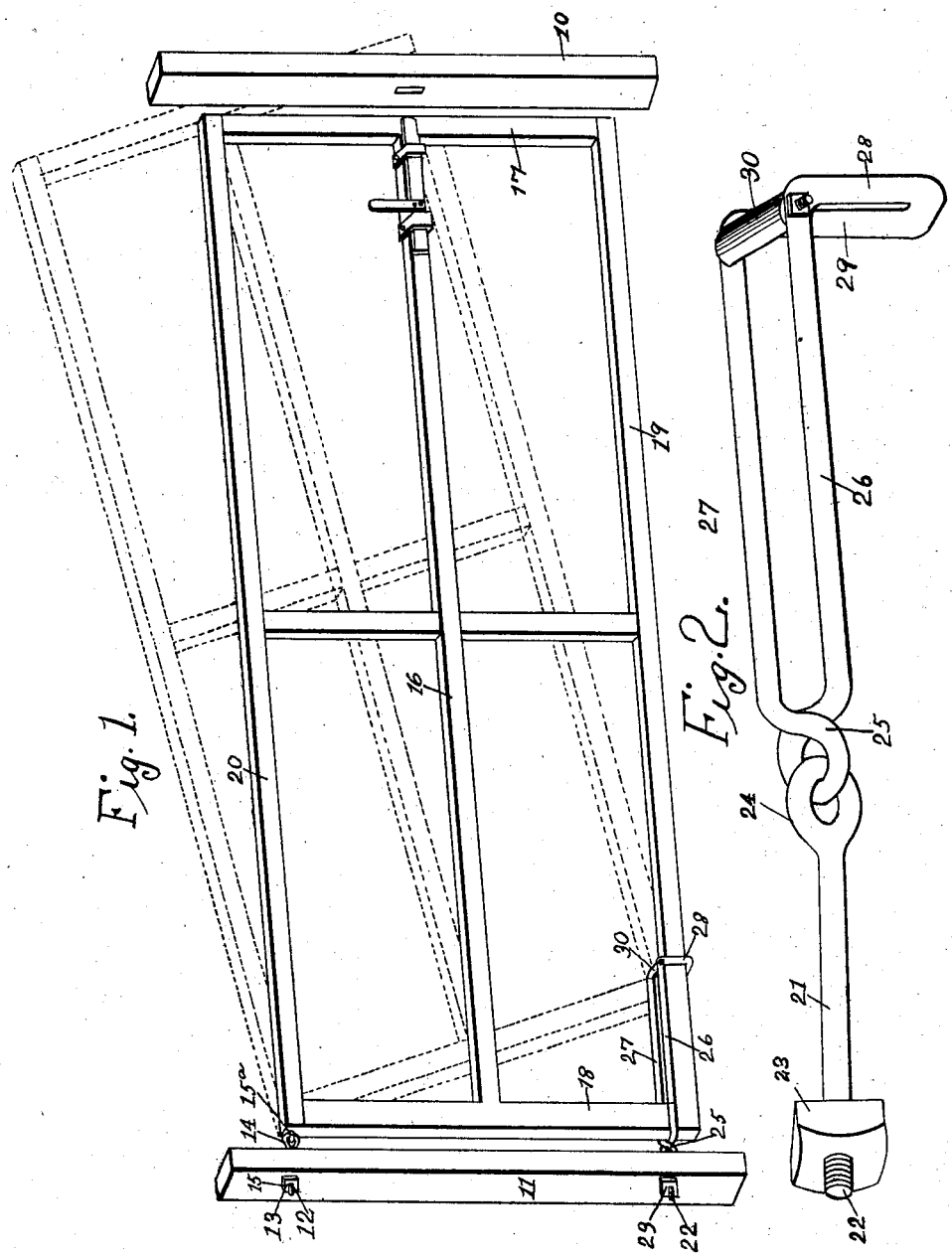
Witnesses.
Inventor, L. F. Volberding.
by Orwig & Lane Attorneys.

No. 742,261. Patented October 27, 1903.

UNITED STATES PATENT OFFICE.

LOUIS F. VOLBERDING, OF DIKE, IOWA.

GATE-HINGE.

SPECIFICATION forming part of Letters Patent No. 742,261, dated October 27, 1903.

Application filed February 20, 1903. Serial No. 144,250. (No model.)

*To all whom it may concern:*

Be it known that I, LOUIS F. VOLBERDING, a citizen of the United States, residing at Dike, in the county of Grundy and State of Iowa, have invented certain new and useful Improvements in Gate-Hinges, of which the following is a specification.

The objects of my invention are to provide a gate-hinge for the ordinary gate which is so arranged that the gate will swing freely and in a horizontal plane in front of the post to which the gate proper is attached.

A further object is to provide a hinge which is designed to be attached to the lower portion of the gate and which will allow the one opening the gate to swing the end of the gate away from the hinges upwardly, and thus raise it over snow or other obstacles which may be in the way of the gate swinging freely.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1 shows in perspective a complete gate and shows in dotted lines the gate in its raised position. Fig. 2 is a detail perspective of the hinge which is attached to the lower portion of the gate.

Referring to the accompanying drawings, I have used the reference-numerals 10 and 11 to indicate the posts between which my gate is designed to swing. To the post 11 I have attached an ordinary hinge 12, comprising a screw-threaded portion 13, having a loop 14 at one end of it and the nut 15 designed to be screwed upon the other end. Through this loop 14 is a second loop 15ª, designed to act with the loop 14 in supporting the upper portion of the gate to which the portion 15ª is attached. The screw-threaded portion 13 is mounted on the post 11, near the top portion of it. The gate referred to, to which the portion 15ª is attached, I have designated by the numeral 16. This gate has the two end portions 17 and 18 and the bottom portion 19 and the top portion 20. Attached near the bottom of the post 11 and extending through it is the screw-threaded supporting-rod 21, having the screw-threaded portion 22 at one end of it designed to admit over the said screw-threaded portion the nut 23. At the other end of the supporting-rod 21 from the screw-threaded portion is the circular loop 24. This supporting-rod is constructed in this manner so that the nut 23 will be at the side of the post 11. Mounted in the loop 24 is the loop 25, having attached to it two parallel rods 26 and 27, said parallel rods being bent downwardly and substantially at right angles to the body portion of these rods 26 and 27, and at the ends which are away from the loop 25 the lower portion of these extensions 28 and 29 are connected. The lower portion of the gate is designed to be admitted between the extensions 28 and 29, and the portions 26 and 27 are designed to admit between them the rear portion 18 of the gate in such a way that these portions 26 and 27 are slightly above the lower portion 19 of the gate.

Connecting the rods 26 and 27 near that point in each of them where the extensions 28 and 29 are formed is the bolt 30. Said bolt is designed to be placed above the lower portion 19, so that the lower portion 19 will move through the opening formed by the extensions 28 and 29, the bolt 30, and the connecting-piece between these extensions 28 and 29.

In practical use the gate will swing as does the ordinary gate on its hinges, and my improved hinge will not prevent the gate swinging in a perfectly horizontal plane; but the end of the gate may be swung outwardly by simply lifting the end of the gate away from the hinges upwardly after it has been swung a slight distance to one side of the post 10. The rear portion 18 will slide longitudinally from the rods 26 and 27 and the lower portion 19 will slide through the opening which is formed between the extensions 28 and 29, the bolt 30, and the connecting-piece between said extensions 28 and 29. This allows the gate to be swung readily, even though snow has accumulated to some depth around it, as but a small amount of the gate has to come into engagement with the snow.

Having thus described my invention, what I claim, and desire to secure by Letters Patent of the United States therefor, is—

In a device of the class described, the combination of a stationary rod having a loop at one end and a screw-threaded portion at its other end, a nut for said screw-threaded portion, a movable member pivoted to the loop of the stationary rod, comprising two parallel sides bent to form a loop and having the right-angled extensions connected at their extremities, and a bolt mounted between the parallel sides.

LOUIS F. VOLBERDING.

Witnesses:
A. F. VOLBERDING,
M. A. BUCHAN.